United States Patent [19]

Champlin

[11] Patent Number: 4,729,277

[45] Date of Patent: * Mar. 8, 1988

[54] SHAPED MECHANICAL COMPRESSION PACKING

[75] Inventor: George B. Champlin, Stoneham, Mass.

[73] Assignee: Seal Company of New England, Manchester, N.H.

[*] Notice: The portion of the term of this patent subsequent to Nov. 5, 2002 has been disclaimed.

[21] Appl. No.: 724,475

[22] Filed: Apr. 18, 1985

Related U.S. Application Data

[63] Continuation of Ser. No. 450,517, Dec. 17, 1982, Pat. No. 4,550,639.

[51] Int. Cl.⁴ .......................... D04C 1/06; D04C 1/12
[52] U.S. Cl. ................................................ 87/7; 87/1; 87/5; 87/8; 87/11
[58] Field of Search ..................... 87/1, 5-8, 87/11

[56] References Cited

U.S. PATENT DOCUMENTS

| | | | |
|---|---|---|---|
| 2,360,106 | 10/1944 | Buhler | 87/6 X |
| 2,667,684 | 2/1954 | Boyer et al. | 87/1 X |
| 2,716,034 | 8/1955 | Main | 87/1 |
| 2,827,319 | 3/1958 | Pearce | 87/6 |
| 3,646,846 | 3/1972 | Houghton et al. | 87/1 |
| 4,550,639 | 11/1985 | Champlin | 87/7 |

Primary Examiner—John Petrakes
Attorney, Agent, or Firm—Robert K. Tendler

[57] ABSTRACT

A non-symmetrical construction of braided mechanical compression packing which does not undergo undesired deformation when placed in use. This non-symmetry of construction results in longer packing life and reduced shaft wear when used to prevent leakage about rotating shafts.

2 Claims, 9 Drawing Figures

SHAPED MECHANICAL COMPRESSION PACKING

This is a continuation of application Ser. No. 450,517, filed Dec. 17, 1982 and now U.S. Pat. No. 4,550,639.

BACKGROUND OF THE INVENTION

This invention relates in general to mechanical compression packing for controlling leakage about shafts, and in particular to packing which does not undergo undesired deformation when placed under load in normal use.

Because there is a wide variety of applications for mechanical packing and seals, including packing for pumps, valves, hydraulic, and pneumatic equipment, a whole industry has grown up in their design and construction. In the areas with which the present invention is concerned, the packing is generally sold in relatively long coils of braided packing material of square or rectangular cross-section from which many suitable lengths may be cut. Conventionally, several lengths are cut from the coil of material for a given installation, each length being formed into a ring about a shaft with the cut ends abutting each other. Often, as many as a half-dozen such rings are disposed about the shaft with their radial sides in abutting relationship.

A so-called packing or stuffing box formed integrally with, and generally extending outwardly from, the housing surrounds the shaft. The interior of the stuffing box is of a diameter sufficiently greater than that of the shaft to accommodate the packing rings. An annular gland is fitted about the shaft and bolted to the exterior of the stuffing box in such a fashion that an end of the gland compresses the packing rings in the stuffing box. Generally, the gland has a flange through which bolts pass which are threaded into the stuffing box. Tightening of the bolts pulls the gland toward the housing and compresses the packing rings within the stuffing box. Under such compression, the materials tend to expand radially to some extent and substantially fill the stuffing box to prevent or minimize the escape of the contents of the housing at the intersection of the shaft and the housing.

In the original manufacture of the packing material, it is braided in the form of a relatively straight length. Because it is then cut to desired short lengths each of which is formed into a ring about a circular shaft, the outside circumference of each packing ring is longer than the inside circumference. Before compression from the gland is applied, the cross-section of each ring tends to form itself into a trapezoidal shape, the narrow side of the trapezoid being the stretched side adjacent the inner surface of the stuffing box. Conversely, the wide side of the trapezoid abuts the shaft. Because of the trapezoidal cross-section which is assumed by each packing ring, the phenomenon is known as "keystoning".

Several problems arise from this keystoning effect. First and foremost, when a plurality of abutting rings are used in a typical application and the packing is compressed by the gland, force is concentrated on the packing ring corners. Severe wear of the shaft under the packing ring corners and of the packing itself at the inner corners is then encountered.

Moreover, the rapid wear of the packing rings foreshortens the useable life of the packing and shaft and reduces the time before leakage becomes intolerable, necessitating adjustment of gland compression.

Various alternatives have been proposed to combat the unwanted effects of keystoning. One alternative involves the use of packing rings which are interspersed with compensating rings machined or die-formed into wedge shapes having the wider axial dimension at the outer diameter. The packing rings are then installed in proper sequence with the "wedge spreaders" to compensate for keystoning. This expedient is useful and has provided some relief from sealing problems, but it is expensive and requires special forms of packing rings and wedges which must be carefully assembled and installed in the proper order.

It is therefore a primary object of the present invention to alleviate problems caused by keystoning of packing rings.

Another object of the present invention is to avoid the use of packing rings and wedges of preshaped cross-sections which must be assembled in a particular sequence.

Still another object of the invention is to avoid the need to die-form packing rings so that they are pre-shaped to fit the stuffing box.

A further object of the invention is the production of mechanical compression packing which is not subject to keystoning.

SUMMARY OF THE INVENTION

Most mechanical compression packing is formed on plait or so-called lattice-braiding machines by braiding yarns from moving yarn carriers about axial warp yarns, in such a fashion that the warp yarns provide fill which is symmetrical about the core. Stated otherwise, the warp yarns when viewed cross-sectionally are conventionally the same in number and by position when any 90° quadrant of a cross-section of the packing is viewed in mirror image compared to the adjacent two quadrants. The cross-section of the packing has a square or rectangular shape when a length of the material is placed on a flat surface, and the opposite sides of the square or rectangle are generally parallel and equal in width. However, when measured lengths of material are wrapped about a cylindrical body such as a pump sleeve or valve shaft to form rings with outer sides abutting the inner surface of a stuffing box, the outer sides are placed under some circumferential tension. As a result, each ring outer side, i.e., the side adjacent the interior of the stuffing box, tends to contract in the direction parallel to the axis of the ring before the rings are compressed by the gland. When the rings are compressed, more of the load is directed axially to the inner portion of the packing rings adjacent the shaft. The force is concentrated at the abutting inner corners of the rings and this results in unwanted wear.

In the present invention, mechanical compression packing is braided in such a fashion that elimination or reversal of the keystoning effect in the installed rings occurs. Such an effect is achieved by the use of additional fill in the outer warps of the braiding machine. Not only may a larger amount of warp fill be placed at what is to become the outer or stuffing box side of the packing material, the amount of corner fill on the inner, or shaft, side of the packing may be reduced. Thus, when a length of packing is measured and cut to form a ring about a shaft, the added material toward the outer surface resists shrinkage in the axial direction of the packing ring to a greater degree than the less dense inner surface. Opposite sides of the rings remain parallel and radial sides abut each other closely and uniformly, distributing the gland load more evenly throughout radial sides of the rings and creating a seal of high integrity as well as lengthening the life of the shaft and the packing.

For a better understanding of the invention, together with other and further features, objects, and advantages, there follows a description of a preferred embodiment which should be read with reference to the attached drawing in which:

DESCRIPTION OF THE PREFERRED EMBODIMENT

Figure 1A:
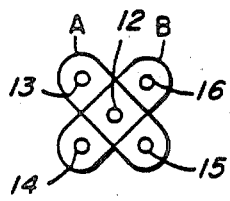
FIGS. 1A–1C illustrate schematically cross-sections of braided compression packing of the prior art.

In FIG. 1A, there is illustrated in cross-section a conventional plait or "square" pattern composed of a central core 12 and axial warp yarns 13, 14, 15, and 16 used to provide fill in the packing material. In some instances, the central core 12 is not utilized However, in either case, each of the warp yarns has yarn from moving carriers, typically eight in number, braided about it, the path of the carriers being represented by A, B. As is obvious from the drawing, in any 90° quadrant of the packing cross-section, the axial warp yarns are the same numerically and by position.

Figure 1B:
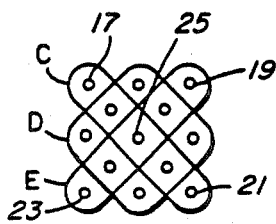

In FIG. 1B, a similar cross-section of a packing material is shown. In this instance, however, a 20-carrier interwoven or so-called "lattice" pattern is shown with the maximum number of warp positions. Each of the warp yarns of which yarns 17, 19, 21 and 23 are typically always used, has yarn from carriers following paths in the braider deck C, D, E braided about it. A central core 25 may or may not be used. However, a structure is formed in which in either case axial warp yarns which constitute the fill are the same in number and by position in any 90° quadrant when viewed in mirror image with respect to each of the two adjacent quadrants.

Figure 1C:
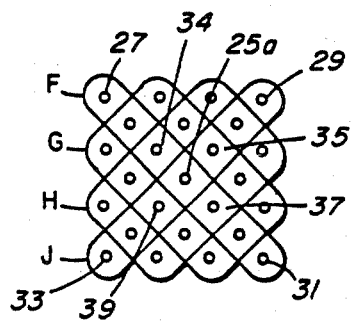

Still another pattern is shown in FIG. 1C. Here, a 36-carrier interwoven or so-called "lattice" pattern is shown with the maximum number of warp positions. Each of the warp yarns, of which yarns 27, 29, 31 and 33 are typically always used and yarns 34, 35, 37, 39 are frequently used, has braided about it and the central core 25a, if used, yarns from carriers following paths F, G, H, J in the braider deck in a symmetrical fashion to form a structure in which the axial warp yarns which constitute the fill are the same in number and by position in any 90° quadrant when viewed in mirror image relative to either adjacent quadrant. The structures illustrated are only three of a variety of patterns which may be used. The technique of lattice braiding is well known in the industry and patterns of three, four, or five tracks have been composed. What all of the patterns as presently braided have in common, however, is symmetry of any one quadrant when viewed in mirror image with each of the two adjacent quadrants.

Figure 2:
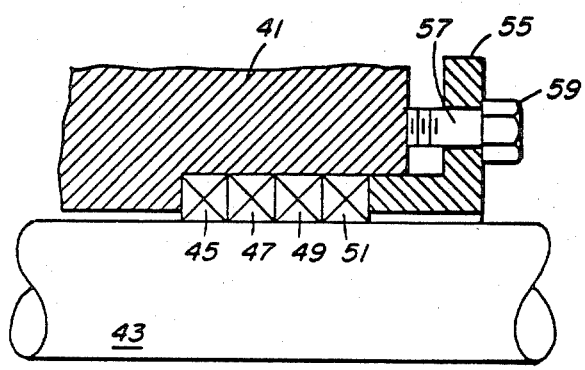
FIG. 2 is an illustration, partly in section, of a shaft passing through a stuffing box with a seal formed of four packing rings which are compressed by a bolted gland.

FIG. 2 is a representation in partial cross section of an ideal packing arrangement. Shown fragmentarily and partly in section is a containment structure 41 which constitutes a stuffing box. Passing through the stuffing box to the interior of the container (not shown) is a cylindrical shaft 43. The shaft, depending upon the application, may run from a source of FIG. 2 to an impeller (not shown) at the left as seen in FIG. 2. Four packing rings 45, 47, 49 and 51 are shown in the positions which they occupy to control leakage of materials. As shown here, the interior of the container would be at the left and leakage to the exterior would be to the right through the intersection of the stuffing box 41 and the shaft 43. A gland 55, conventionally formed as a flanged annulus, is provided. A series of openings are formed in the flange parallel to the gland axis. Bolts such as the bolt 57 are passed through the openings and threaded into the end of the stuffing box 41. The bolts are tightened with the object of causing the bolt heads as at 59 to bring pressure uniformly upon the gland and packing rings.

Figure 3:
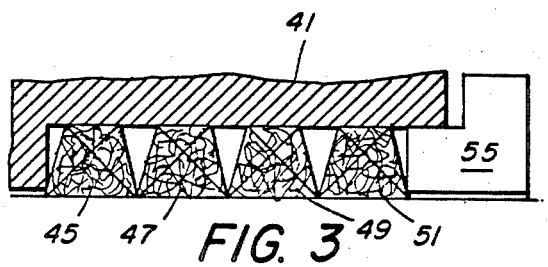
FIG. 3 illustrates the keystoning of four packing rings of the prior art in the stuffing box before compression by the gland.

In practice, however, the idealized situation shown in FIG. 2 is not achieved with packing rings of the prior art. As has been described above, wrapping of the packing rings about the cylindrical shaft causes the keystoning phenomenon to occur. FIG. 3 illustrates that keystoning effect. In FIG. 3, each of four packing rings 45–51 will be seen to have assumed a trapezoidal cross-sectional shape. This occurs prior to any compression being applied to the rings by the gland 55 and, in fact, on individual rings prior to die forming if such a technique is employed.

Figure 4:
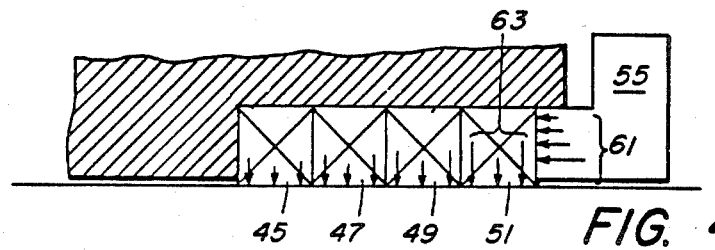
FIG. 4 illustrates the loading effects caused by keystoning of four the packing rings after compression by the gland.

In FIG. 4, the loading effects caused by keystoning are illustrated. Pressure from the gland 55 is greatest upon the wider inner sides of the four packing rings as represented by the arrows 61 which denote a pressure gradient. The forces upon the packing rings are such that the greatest loading is exerted upon the shaft adjacent the inner lower corners of each of the packing rings, as illustrated by the arrows 63 which represent force. Under such conditions, wear of the packing rings as well as the shaft is rapid at the points of great force.

Figure 5:
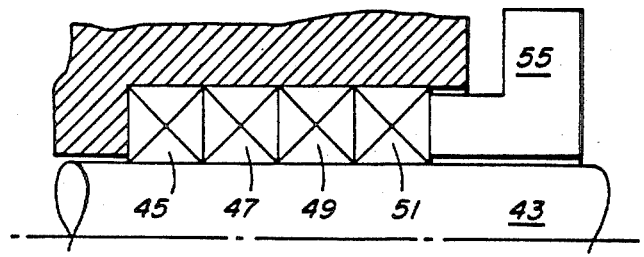
FIG. 5 illustrates four installed packing rings braided in accordance with the present invention before compression by the gland.

In FIG. 5, the effect of the non-symmetrical braiding on four packing rings cut from braided mechanical packing made in accordance with the present invention is shown. Neither before 45–51 maintain a cross-section in which opposite sides remain parallel despite the wrapping of the rings about the shaft 43. Sides of the rings parallel to the axis abut each other uniformly and closely.

Figure 6:
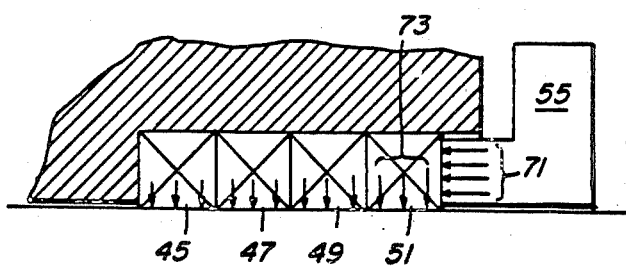
FIG. 6 illustrates the loading effects achieved in the present invention after compression by the gland; and, FIG. 7 is a schematic illustration of a cross section of braided compression packing made in accordance of the subject invention.

In FIG. 6, the loading effects on the non-symmetrical braided packing rings are illustrated. Because of the parallel close abutment of the packing rings with one another and with the end of the gland 55, forces exerted by the gland parallel to the axes of the shaft and packing rings are equal as represented by the arrows 71. These forces are translated into equal loading effects of each of the packing rings 45–51 upon the shaft 43, as indicated by the arrows 73 which represent a pressure gradient. As has been noted, the non-symmetrically braided mechanical packing creates a packing ring in which the opposite cross-sectional sides are essentially parallel when the packing ring is installed.

Although there is a vast number of applications for mechanical packing, there has been some effort made toward standardization of dimensions in the industry. Mechanical packing of any given cross-sectional dimension is commonly associated for use with a range of shaft diameters in which the variation in diameter is approximately 40% for pump shafts. The placement of warp fill in mechanical packing made in accordance with the present invention is preferably such that essential parallelism of the opposite sides of the installed packing ring occurs at or near the minimum shaft diameter for which the cross section is intended. As a result, keystoning will be eliminated or, in the extreme, slightly reversed in the installed rings. Elimination of the keystoning results in a more uniform normal load being applied between the packing rings and the shaft. In addition to superior leakage control, the useable life of the packing rings and the shaft is considerably extended.

Figure 7:
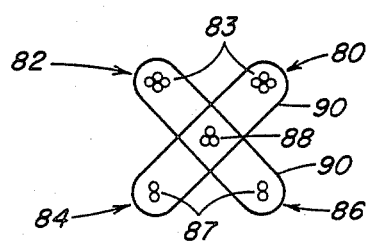

Referring now to FIG. 7 a schematic diagram illustrates in cross section one embodiment of a braided compression packing in which corners 80 and 82 have greater amounts of warp fill 83 than do the lower corners 84 and 86 as illustrated at 87. This differential in the amount of corner fill between the inner and outer edges of the packing may be provided by differing numbers of braided axial warp yarns or in any other fashion so as to vary the amount of corner fill to eliminate keystoning. Thus in one embodiment, the reversal of the keystone effect is provided by the use of additional fill in the outer warps. Central core warps 88 or other internal warps, if used, in one embodiment can differ in number, and thus amount of material, from that associated with the corners. As before, additional yarns are braided about the axial yarns along a path generally indicated by 90.

The present invention should not be limited to the details of the embodiments illustrated. Variations in numbers of rings, in materials, and in structural details will suggest themselves to those skilled in the art. Basic to the invention is the concept of building into mechanical packing the capacity to resist undesired deformation and avoid harmful loading effects. The invention should be limited only by the spirit and scope of the appended claims.

What is claimed is:

1. Mechanical compression packing of square or rectangular cross-section having central core yarns, a plurality of axial warp yarns, said pluality of said axial warp yarns being placed in a predetermined unsymmetrical pattern having different numbers or amounts of warp fibers at different positions and carrier yarns braided about said warp yarns, such that parallelism of opposite cross-sectional sides of said completed packing is maintained as said packing is wrapped about a cylindrical surface.

2. In the manufacture of braided mechanical compression packing of a square or rectangular cross-section having outer corners, inner corners, central core yarns, and axial warp yarns utilizing yarn carriers, the steps of arranging said axial warp yarns about said central core yarns in a predetermined non-symmetrical pattern in which warps adjacent the outer corners have more fibers than warps adjacent the inners corners, and braiding yarns from said yarn carriers about said central core yarns and said axial warp yarns in such fashion that the cross-section of said yarns is such that any one 90 degree quadrant is a mirror image of only one of the two quadrants adjacent thereto.

* * * * *